US009446670B1

(12) United States Patent
McCorkindale

(10) Patent No.: US 9,446,670 B1
(45) Date of Patent: Sep. 20, 2016

(54) ENERGY GENERATING SYSTEM

(71) Applicant: Jeffrey McCorkindale, East Long Meadow, MA (US)

(72) Inventor: Jeffrey McCorkindale, East Long Meadow, MA (US)

(*) Notice: Subject to any disclaimer, the term of this patent is extended or adjusted under 35 U.S.C. 154(b) by 0 days.

(21) Appl. No.: 15/016,560

(22) Filed: Feb. 5, 2016

Related U.S. Application Data

(60) Provisional application No. 62/112,349, filed on Feb. 5, 2015.

(51) Int. Cl.
| | |
|---|---|
| *F03D 9/00* | (2016.01) |
| *H02P 9/04* | (2006.01) |
| *B60L 8/00* | (2006.01) |
| *B60L 11/18* | (2006.01) |

(52) U.S. Cl.
CPC ............ *B60L 8/006* (2013.01); *B60L 11/1809* (2013.01); *F03D 9/002* (2013.01)

(58) Field of Classification Search
CPC ......... B60L 8/00; B60L 8/006; B60K 16/00; B60K 2016/006
USPC ........... 290/44, 55; 322/1; 180/2.1, 2.2, 165, 180/65.3; 415/121.3; 416/55
See application file for complete search history.

(56) References Cited

U.S. PATENT DOCUMENTS

| | | | |
|---|---|---|---|
| 3,876,925 A | 4/1975 | Stoeckert | |
| 4,314,160 A | 2/1982 | Boodman et al. | |
| 5,850,108 A | 12/1998 | Bernard | |
| 6,838,782 B2 | 1/2005 | Vu | |
| 7,211,905 B1 | 5/2007 | McDavid, Jr. | |
| 8,169,182 B1* | 5/2012 | Kimble | B60L 8/006 290/44 |
| 8,220,569 B2 | 7/2012 | Hassan | |
| 8,371,401 B1* | 2/2013 | Illustrato | B60K 16/00 180/2.2 |
| 8,710,789 B2 | 4/2014 | Mardirossian | |
| 2002/0153178 A1* | 10/2002 | Limonius | F03D 9/002 180/2.2 |
| 2004/0084908 A1* | 5/2004 | Vu | B60K 6/48 290/55 |
| 2011/0100731 A1 | 5/2011 | Hassan | |
| 2011/0198135 A1 | 8/2011 | Kalinina et al. | |
| 2012/0056428 A1 | 3/2012 | Bennett et al. | |
| 2012/0299527 A1 | 11/2012 | Vo | |
| 2013/0043082 A1 | 2/2013 | Tran | |
| 2013/0115069 A1 | 5/2013 | Zha et al. | |
| 2013/0127393 A1 | 5/2013 | Garcia | |
| 2014/0103657 A1* | 4/2014 | Perriere | F03D 7/0244 290/44 |

FOREIGN PATENT DOCUMENTS

WO     2011011856 A1     2/2011

OTHER PUBLICATIONS

Gizmodo; Strap this Wind Turbine to Your Electric Car to Stay Juiced in Park, Jan. 8, 2014, http://gizmodo.com/strap-this-wind-turbine-to-your-electric-car-and-you-ca-1497320336.

* cited by examiner

*Primary Examiner* — Tulsidas C Patel
*Assistant Examiner* — Thomas Quigley
(74) *Attorney, Agent, or Firm* — Eric L. Sophir; Dentons US LLP

(57) ABSTRACT

An energy generating system may comprise a plurality of airfoils rotating about an axis that is perpendicular to an axis along a flow of air, the airfoils being staggered in multiple rows perpendicular to the axis along the flow of air and across a top surface of a vehicle, and a plurality of generators each comprising a rotor and a stator, each stator configured to channel the airflow along the leading edge of the airfoils, each rotor connected to each of the plurality of airfoils, the rotor configured to generate energy by rotating around the axis, the energy converted into electrical power.

19 Claims, 12 Drawing Sheets

ENERGY GENERATING SYSTEM

CROSS-REFERENCE TO RELATED APPLICATIONS

This application claims priority to U.S. Provisional Patent Application Ser. No. 62/112,349, filed Feb. 5, 2015, which is hereby incorporated by reference in its entirety.

FIELD OF THE INVENTION

The invention is in the field of generating power using a plurality of airfoils located on the top of a vehicle.

BACKGROUND

Many variations of wind turbines for vehicles have been designed. However, most designs do not utilize air current effectively and not efficiently implemented. Many designs may be implemented as an attachment to the front hood or even installed in fog light holes of a vehicle. These types of designs tend to not utilize the maximum amount of wind flow. Some designs incorporate a cluster of giant fans all over the vehicle. These types of designs may allow a significant amount of air to escape though the fans thus adding more drag than energy captured, rendering the designs mostly inefficient. Additionally, many existing designs are not considered esthetically pleasing.

Therefore, a need exists for a system that is streamlined, efficient, versatile, esthetically pleasing and is easy to clean.

SUMMARY

The embodiments described herein can generate power using a plurality of airfoils located on the top of a vehicle capturing wind energy and storing the energy in a storage unit to provide power to the vehicle. The system may be placed on the roof area of vehicles to maximize the usable current of air without causing any, if very little, added drag and/or resistance. The airfoils may be placed in multiple rows horizontally and/or vertically across the vehicle. The airfoils may rotate around an axis that is perpendicular to the flow of air. The airfoils may be staggered to prevent any counter resistance of air flow.

Generators may be placed in between each of the staggered airfoils. The system may consist of a plurality of generators, each comprising a stator and a rotor. The stators may channel the air along the leading edge of the airfoils providing the most efficient use of all air current. The rotors may be connected to each airfoil through a central axle. When the airfoils rotate, they also rotate the axle which spins the rotor. The energy recovered by the rotor of the generator can be converted into electrical energy. The generator may be connected to a wire that may transmit the generated electrical energy to a storage unit. The storage unit may be a battery, a capacitor, and/or any other power storing mechanism. The storage unit may be accessed through a power port of a vehicle in order to provide charge to the vehicle, and/or for any other power supplying means. There may be drains along the side of the system that channel any water out of the bottom of the encasement. The components may be easily removed for cleaning if needed.

The system may be easily customizable for different vehicles to incorporate more or less airfoils and generators. In some implementations, the system may integrate into the existing wiring of a charging unit in a vehicle, which provides for adaptability along with ease of replacement if needed. In other implementations, the system may be separately mounted on top of the vehicle, using the existing vehicle plug-in as a connection. The system may charge the vehicle as the vehicle is operated by plugging the wiring into an external charging port of the vehicle (e.g., port where an electric car receives charge).

In one embodiment, an energy generating system may comprise: a plurality of airfoils rotating about an axis that is perpendicular to an axis along a flow of air, the airfoils being staggered in multiple rows perpendicular to the axis along the flow of air and across a top surface of a vehicle; a plurality of generators each comprising a rotor and a stator, each stator configured to channel the airflow along the leading edge of the airfoils, each rotor connected to each of the plurality of airfoils, the rotor configured to generate energy by rotating around the axis, the energy converted into electrical power; a plurality of wires connected to the generators, the wires configured to transmit the electrical power into a storage unit; and a plug connected to the storage unit and attached to a charging port of the vehicle configured to charge the vehicle with the stored electrical power.

In another embodiment, an energy generating system may comprise: a plurality of airfoils rotating about an axis that is perpendicular to an axis along a flow of air, the airfoils being staggered in multiple rows perpendicular to the axis along the flow of air and across a top surface of a vehicle; and a plurality of generators each comprising a rotor and a stator, each stator configured to channel the airflow along the leading edge of the airfoils, each rotor connected to each of the plurality of airfoils, the rotor configured to generate energy by rotating around the axis, the energy converted into electrical power.

In yet another embodiment, an energy generating system comprises a plurality of airfoils rotating about an airfoil axis that is perpendicular to an axis along a flow of air, the airfoils being staggered in multiple rows perpendicular to the axis along the flow of air and across a top surface of a vehicle; a plurality of gearboxes, each gearbox coupled to each of the plurality of airfoils; a plurality of electro-mechanical generators each comprising a rotor and a stator, each stator configured to channel the airflow along the leading edge of the airfoils, each rotor coupled to each of the plurality of gearboxes; a plurality of wires connected to the electro-mechanical generators, the wires configured to transmit the electrical power into a storage unit; and a plug connected to the storage unit and attached to a charging port of the vehicle configured to charge the vehicle with the stored electrical power, wherein each gearbox provides a speed up ratio for the rotational speed of the airfoil axis to the rotational speed of the rotor.

Additional features and advantages of an embodiment will be set forth in the description that follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

Non-limiting embodiments of the present disclosure are described by way of example with reference to the accom

DETAILED DESCRIPTION

Figure 1:
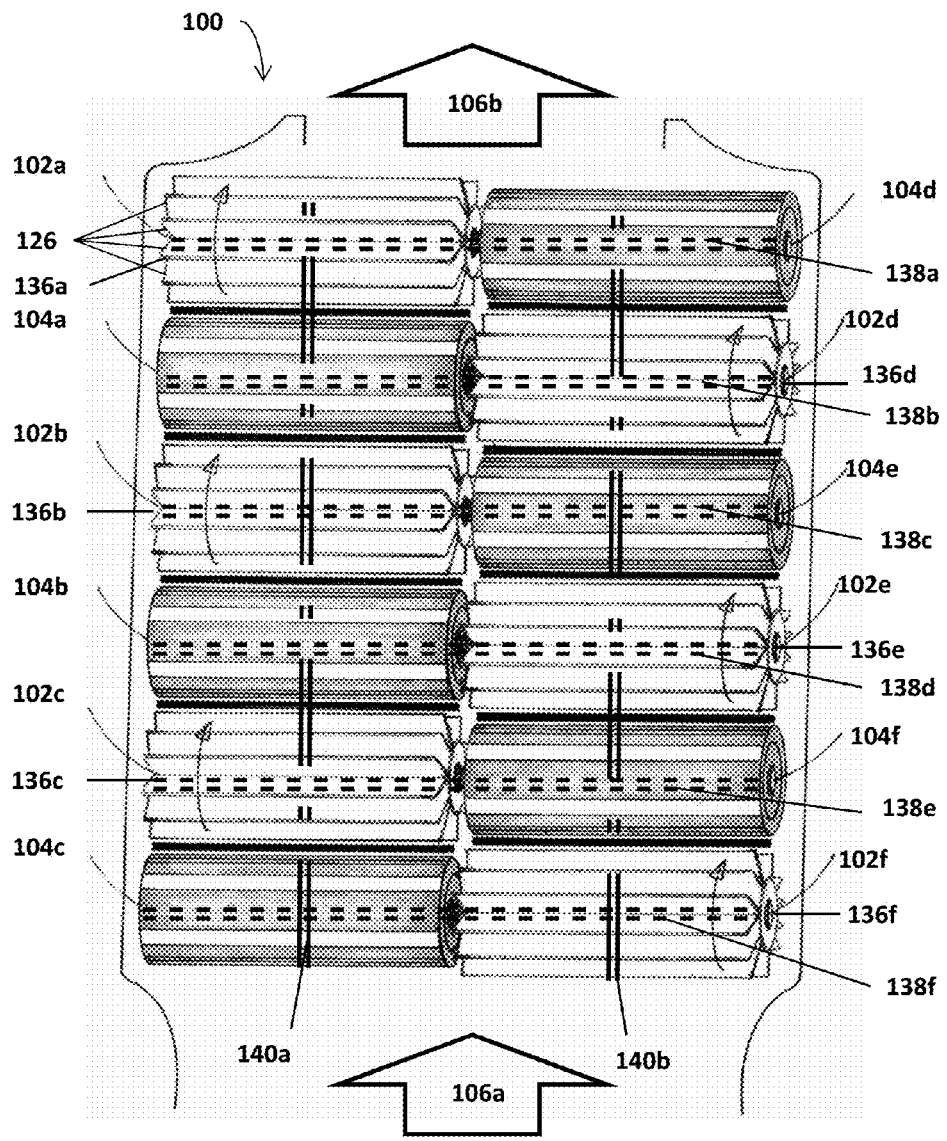
- FIG. 1 is a top view of the energy generating system, according to an exemplary embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

FIG. 1 is a top view of the energy generating system 100, according to an exemplary embodiment. The system comprises a plurality of airfoils 102a, 102b, 102c, 102d, 102e, 102f, which rotate on an axis 138a, 138b, 138c, 138d, 138e, 138f that is perpendicular to an axis 140a, 140b along a direction of air flow 106a, 106b. The airfoils 102a, 102b, 102c, 102d, 102e, 102f may be staggered in multiple rows perpendicular to the axis 140a, 140b along a direction of air flow 106a, 106b to prevent any counter resistance of air flow 106a, 106b. The airfoils 102a, 102b, 102c, 102d, 102e, 102f may be arranged in a staggered pattern. Each airfoil 102a, 102b, 102c, 102d, 102e, 102f may be staggered on a parallel axis 138a, 138b, 138c, 138d, 138e, 138f. In each column and row, the airfoils 102a, 102b, 102c, 102d, 102e, 102f may be surrounded by generators 104a, 104b, 104c, 104d, 104e, 104f. For example, airfoil 102a, may be staggered with airfoil 102d by being placed in different positions on parallel axes 138a, 138b. Airfoil 102a may be primarily surrounded on the right side by generator 104d and on the bottom by generator 104a.

In one embodiment, the airfoils 102a, 102b, 102c, 102d, 102e, 102f may not overlap in the staggering. For example, the bottom edge of airfoil 102a may not overlap with the top edge of airfoil 102d by staying within the boundary of the first row and not extending into the second row comprising generator 104a and airfoil 102d. In some implementations, the generators 104a, 104b, 104c, 104d, 104e, 104f may be the same width as the airfoils 102a, 102b, 102c, 102d, 102e, 102f thus preventing overlap into each row.

In another embodiment, there may be overlap of the airfoils 102a, 102b, 102c, 102d, 102e, 102f in the staggering. For example, airfoil 102a may have a bottom edge that extends into the second row comprising airfoil 102d and generator 104a. In some implementations, the generators 104a, 104b, 104c, 104d, 104e, 104f may be narrower than the airfoils 102a, 102b, 102c, 102d, 102e, 102f thus allowing overlap into each row.

In some implementations, the airfoils 102a, 102b, 102c, 102d, 102e, 102f may be staggered horizontally across the vehicle and/or vertically across the vehicle in order to convert wind energy into electrical energy. As the vehicle moves forward, the air flow 106a, 106b may start at the first airfoil 102f and end at the last generator 104d. Each airfoil 102d, 102e, 102f may comprise a plurality of blades 126 extending outward from an axle 136a, 136b, 136c, 136d, 136e, 136f which is central to the blades 126. The blades 126 may rotate in a direction perpendicular of air flow 106a, 106b. The blades of each airfoil 102d, 102e, 102f may catch the wind and cause the airfoil to rotate in a clockwise manner.

Each airfoil 102a, 102b, 102c, 102d, 102e, 102f may comprise a plurality of blades 126 that radially extend from an axle 136a, 136b, 136c, 136d, 136e, 136f of the airfoil. Each blade may include a leading edge that is coupled to the axle 136a, 136b, 136c, 136d, 136e, 136f and a trailing edge that extends outwards. For example, the air flow 106a, 106b may engage the leading edge and flow toward the trailing edge of airfoil 102a. Due to the shape of the plurality of blades 126, aerodynamic forces caused by the flow induce the blades 126 to rotate, thereby driving the generator 104a to produce electrical power. Efficiency of the system may be partially dependent upon converting linear air flow into rotational energy. Therefore, the blades 126 may be particularly configured to efficiently transfer wind energy into rotational motion. For instance, blade shape may be selected to enhance air flow over the blade such that aerodynamic forces induce the blade to rotate. In addition, the blades 126 may be substantially smooth, such that air flows over the blades 126 without interference.

The blades 126 may be coupled to an axle 136a, 136b, 136c, 136d, 136e, 136f of each airfoil. The axle 136a, 136b, 136c, 136d, 136e, 136f may be connected to a rotor of each generator. The blades 126 are configured to convert the linear air flow from the wind into rotational motion. As the blades 126 rotate, the coupling between the axle 136a, 136b, 136c, 136d, 136e, 136f and the rotor within the generator begins to rotate, thereby producing electrical energy. Each of the axles 136*a*, 136*b*, 136*c*, 136*d*, 136*e*, 136*f* for the plurality of airfoils 102*a*, 102*b*, 102*c*, 102*d*, 102*e*, 102*f* may be mechanically connected to each of a plurality of rotors for each of the generators 104*a*, 104*b*, 104*c*, 104*d*, 104*e*, 104*f*. The blades 126 of each airfoil may have a particular shape to help propel the air in a particular direction. The shape of the blades 126 may be designed so that as air passes over each blade, the airfoils speed up. The air flow 106*a*, 106*b* hitting the aerodynamic blade is forced upwards along the top of each generator. The air flow 106*a*, 106*b* continues to increase as each airfoil spins. As each airfoil utilities the air flow 106*a*, 106*b* and adds additional air flow to be send to the subsequent airfoil, a consequential increase in the speed of the incoming air occurs. This results in an increase in the pressure of the air reaching the each of the plurality of airfoils 102*a*, 102*b*, 102*c*, 102*d*, 102*e*, 102*f* and therefore generates an increase in the pressure drop across the blades 126, with a resultant increase in power output.

In some implementations, the airfoils and/or blades may be made out of a carbon fiber type material that may or may not need to be reinforced with Kevlar to aid in the strengthening and efficiency of airfoils to capture the wind. The airfoils and/or blades may be made of a special material to increase strength, durability, balance, and efficiency.

The system additionally comprises a plurality of generators 104*a*, 104*b*, 104*c*, 104*d*, 104*e*, 104*f*. The generators 104*a*, 104*b*, 104*c*, 104*d*, 104*e*, 104*f* may convert the mechanical energy generated by the airfoils rotating to electrical energy for storage in a storage unit (e.g., battery and/or capacitor). The generators 104*a*, 104*b*, 104*c*, 104*d*, 104*e*, 104*f* may be staggered in between each of the airfoils 102*a*, 102*b*, 102*c*, 102*d*, 102*e*, 102*f*.

Each generator 104*a*, 104*b*, 104*c*, 104*d*, 104*e*, 104*f* may comprise a stator and a rotor. The stator may remain stationary while the rotor spins. The stators may assist the air flow along the leading edge of the airfoils 102*a*, 102*b*, 102*c*, 102*d*, 102*e*, 102*f* by creating a wall and/or block that the air cannot go through, and must go above. Each rotor may be mechanically connected to each airfoil 102*a*, 102*b*, 102*c*, 102*d*, 102*e*, 102*f* through the axle of each airfoil. The mechanical connection may be through a band, a reel, a tube, and/or any other flexible connector. When the airfoils 102*a*, 102*b*, 102*c*, 102*d*, 102*e*, 102*f* rotate, they also rotate the rotor, which generates power to be stored in a storage unit connected to the generators 104*a*, 104*b*, 104*c*, 104*d*, 104*e*, 104*f*.

Each airfoil 102*a*, 102*b*, 102*c*, 102*d*, 102*e*, 102*f* may additionally generate air current for the subsequent airfoil. As each airfoil 102*a*, 102*b*, 102*c*, 102*d*, 102*e*, 102*f* is speeding up, the airfoils are creating more propulsion towards the next airfoil 102*a*, 102*b*, 102*c*, 102*d*, 102*e*, 102*f*. The airfoils 102*a*, 102*b*, 102*c*, 102*d*, 102*e*, 102*f* are staggered so the first airfoil 102*f* will not interfere with the air generated by the second airfoil 102*e*, thus allowing the air to constantly move in the direction of air flow 106*a*, 106*b*.

The system 100 may adaptable for every electric car, electric hybrid car and/or any other vehicle. The exemplary embodiments describe a vehicle, though it is intended that any vehicle (e.g., car, truck, van, sport utility vehicle) having any powertrain (e.g., gasoline engine, diesel engine, electric engine, hybrid engine, hydrogen engine). The system may be implemented on any top surface of a vehicle including the roof of the vehicle and the hood of the vehicle. Additionally and/or alternatively, the system may be implemented on the side of the vehicle and/or in the front grille of the vehicle. In some implementations, the number of the airfoils and the number of the generators may be altered depending on the size of the vehicle. For example, the system for a sport utility vehicle (SUV) may have more airfoils and more generators than the system for a compact vehicle. In some implementations, multiple layers (e.g., stacking layers of the airfoils and generators) of the system may be implemented on the vehicle to capture more airflow and generate more energy.

Figure 2:
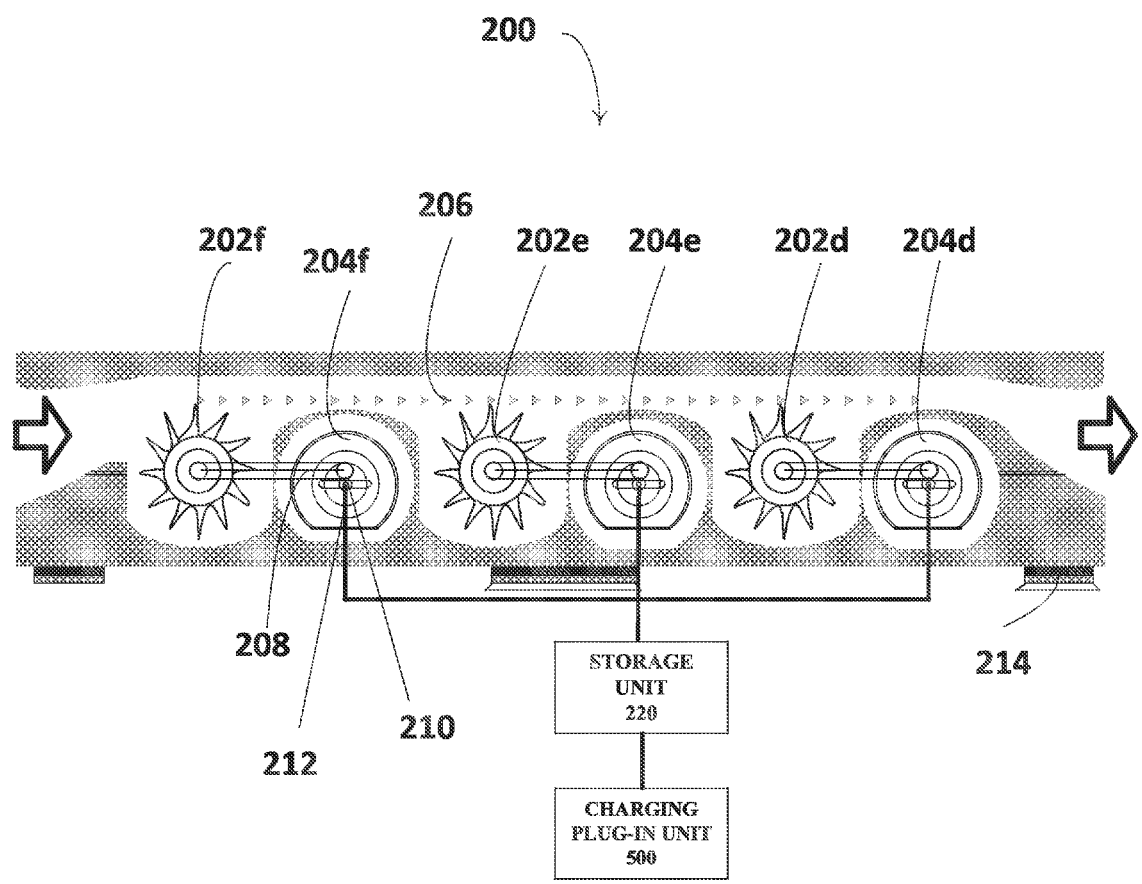
FIG. 2 is a side view of the energy generating system, according to an exemplary embodiment.

FIG. 2 is a side view of the energy generating system 200, according to an exemplary embodiment. The energy generating system 200 comprises a frame 216 and may be mounted to a vehicle through a mounting mechanism 214. The mechanism 214 may be a suction mechanism, screwed into the top of the vehicle, attached using adhesive, mechanically coupled, and/or through any mounting means.

The energy generating system 200 may be mounted on the roof of the vehicle and may be a component modular based system to allow it to be customizable to all electric and/or hybrid vehicles. The energy generating system 200 may have adjustable mounting and leveling points to allow for taper of different roof pitches. The energy generating system 200 may attach to existing roof rail tracks already on some vehicles and/or have its own base with an adjustable roof rail system. In some implementations, the energy generating system 200 in commercial applications could have a permanent mounted system. Depending on the vehicle with a sunroof for example, the energy generating system 200 could be mounted just behind where the sunroof ends and extend to the end of the roof as long as there are enough generators to supply enough energy for the vehicle.

As the vehicle moves forward, the air flow 206 may start at the first airfoil 202*f* and end at the last generator 204*d*. Each airfoil 202*d*, 202*e*, 202*f* may comprise a plurality of blades 226 extending outward from an axle. The blades 226 may be perpendicular to the direction of air flow 206. The blades 226 of each airfoil 202*d*, 202*e*, 202*f* may catch the wind and cause the airfoil to rotate in a clockwise manner.

The air flow 206 may propel a plurality of airfoils 202*f*, 202*e*, 202*d*, which may be connected to a plurality of rotors to generate energy. For example, when the first airfoil 202*f* rotates, rotor 210 that is connected 208 to axle of the airfoil 202*f* may additionally rotate due to the connection. The connection may be through a band, a reel, a tube, and/or any other flexible connector. The energy recovered by the rotor 210 of the generator 204*f* can be converted into electrical energy. The generator 204*f* may be connected to a wire 212 (e.g., wire or cable harness) that may transmit the generated electrical energy to a storage unit 220. The storage unit may be a battery, a capacitor, and/or any other power storing mechanism. The storage unit may be accessed through a power port of a vehicle (charging plug-in unit 500 shown in FIG. 5), in order to provide charge to the vehicle, and/or for any other power supplying means.

In some implementations, a dual battery option may be implemented allowing a first battery to run while a second battery charges. The second battery may be considered depleted based on a predetermined set percentage. At that point the first battery's remaining charge may be drained to zero before recharging the first battery to prevent any battery memory. Battery memory may occur when a battery is recharged when it is not fully depleted causing the battery to think it is getting a full charge when only charging to a percentage (e.g., 80%) of actual usable charge. In another implementations, a dual stage single battery may work the same as two separate batteries.

The frame 216 may be molded of a plastic or a composite material and have an integrated aluminum structure to provide mounting points for components of the energy generating system 200. It is understood that other suitable materials can be used to form the frame and/or mounting structures of the energy generating system 200, and that the frame 216 can comprise multiple pieces.

Figure 3:
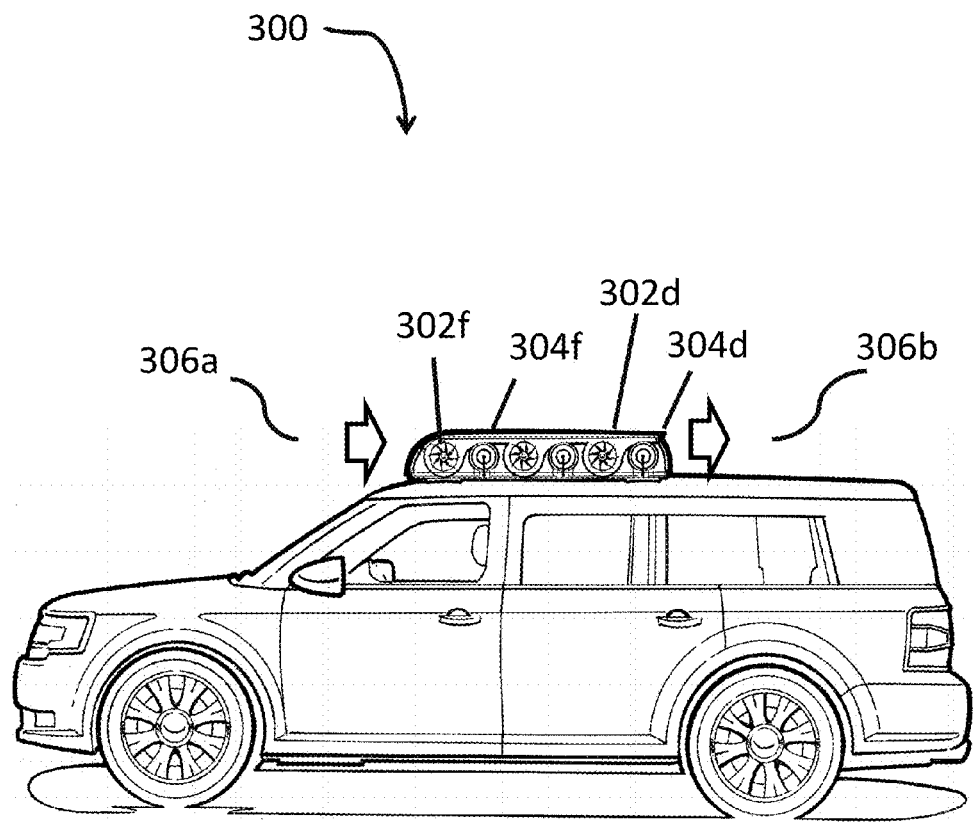
FIG. 3 shows a side view of the energy generating system implemented on the top portion of a vehicle, according to an exemplary embodiment.

FIG. 3 shows a side view of the energy generating system 300 implemented on the top portion of a vehicle, according to an exemplary embodiment. As the vehicle accelerates, air flow 306*a* enters the system 300. As the air pushes each of the plurality of blades of the air foils 302*f,* 302*d*, the airfoils 302*f,* 302*d* rotate and causing their axle to spin. Each axle is connected to a rotor for each of the plurality of generators. When the axle spins, the rotor also spins causing the plurality of generators 304*f,* 304*d* to generate power to store in a storage unit.

As the air enters the system through a port 306*a*. The port 306*a* may comprise a slight ramp that may be angled downward and/or upward toward the plurality of airfoils 302*f,* 302*d*. In some implementations, the port 306*a* may be parallel to the plurality of airfoils 302*f,* 302*d*. The air that enters the system may be directed to flow over airfoils 302*f,* 302*d*. The first airfoil 306*a* may propel the air to the next airfoil. This process may repeat for each of the plurality of airfoils 302*f,* 302*d* that are directed towards the next airfoil.

Figure 4:
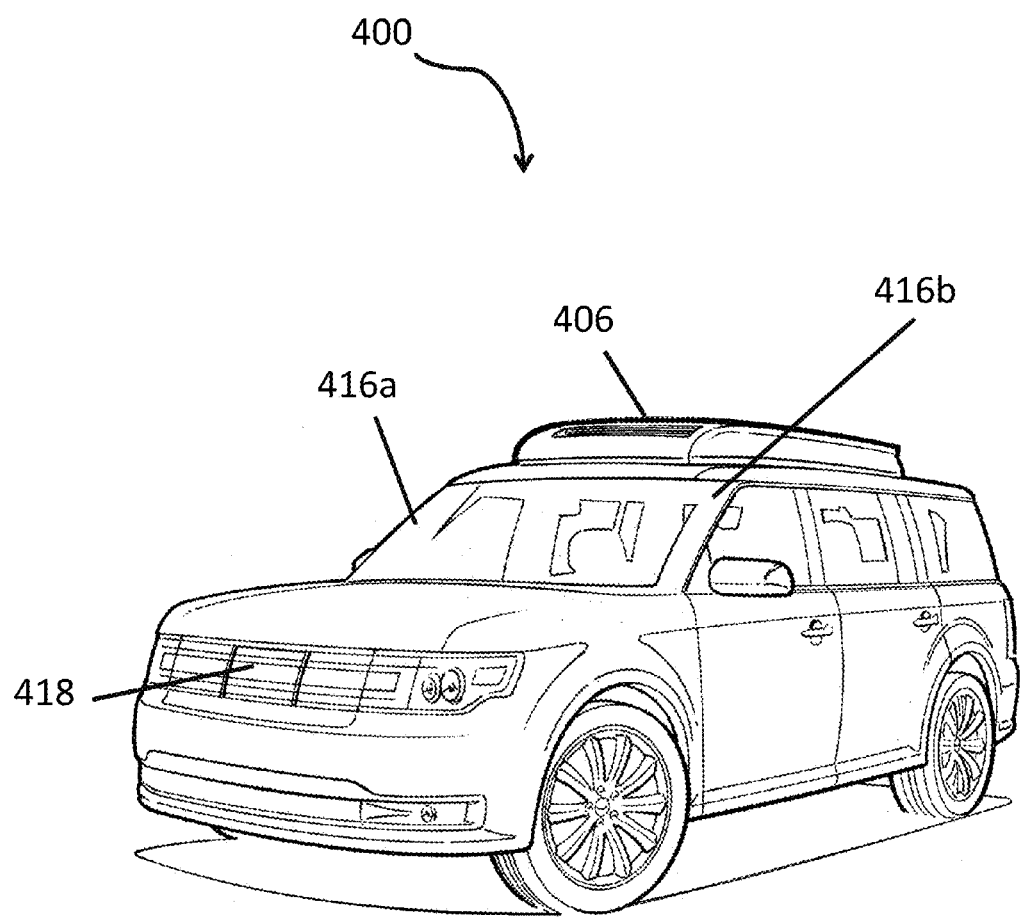
FIG. 4 shows a front perspective view of the energy generating system implemented on the top portion of a vehicle, according to an exemplary embodiment.

FIG. 4 shows a front perspective view of the energy generating system 400 implemented on the top portion of a vehicle, according to an exemplary embodiment. In one embodiment, system 400 may be integrated into the roof 406 of the vehicle during manufacturing as a built in system. For example, the system may be encompassed within the sheet metal on the roof and use the internal wiring in the vehicle to connect. The system may additionally be added as a pillar and/or any aesthetic design on the top of the car while utilizing the internal wiring of the vehicle. In some implementations, any type of device attached to the roof and/or top of the vehicle to harness wind to create energy may be implemented in combination with the airfoils and generators of the system. Additionally, wiring may be internal to the car to provide charge from the battery.

In other embodiments, the system 400 may be mounted to the roof 406 of the vehicle as an add on part after manufacturing using any mounting means. A wire external to the vehicle may connect the system 400 to the charging port. For example, a wire may be run through a wiring harness on the side of the windshield 416*a*, 416*b* and connect to a charging port 418 that may be located on the front part of the vehicle. As the vehicle is operated, the wire may be plugged into the front port providing power to the vehicle as it accelerates and generates electrical power through wind energy.

The wiring system may be adaptable to function with different shapes and sizes of vehicles. For example, the system may be placed on top of the vehicle, and the wiring may be incorporated throughout the length of the vehicle, the body of the vehicle, underneath the vehicle and/or in any way to have access to the charging port 418 of the vehicle.

Figure 5:
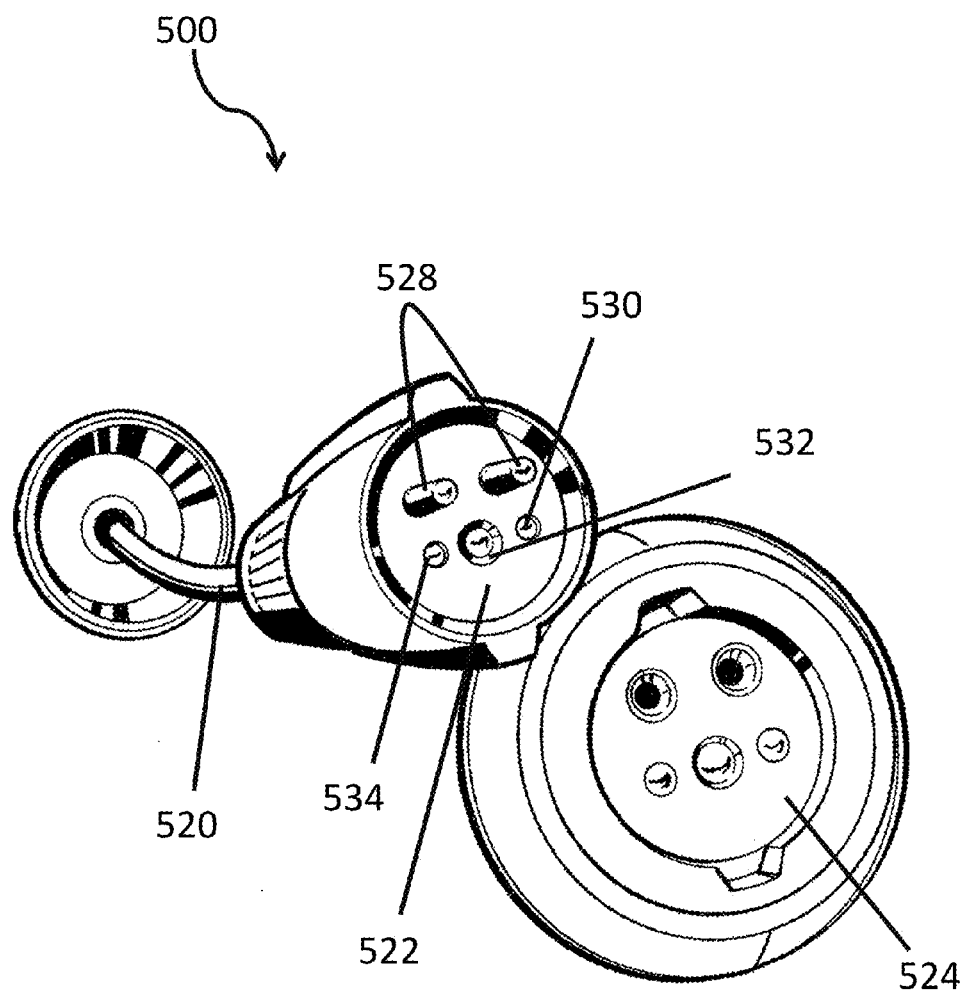
FIG. 5 is a charging plug-in unit for the energy generating system, according to an exemplary embodiment.

FIG. 5 is a charging plug-in unit 500 for the energy generating system, according to an exemplary embodiment. The charging plug-in unit 500 may comprise a plug 522, a retractable wire 520 and a charging port 524 that is located on the vehicle. The plug 522 may comprise a retractable wire 520 that can be retracted to fit into the system. In some implementations, the plug 522 may be the SAE-standard J1772 plug. In some implementations, the charging plug 522 may comprise five ports that connect to the vehicle. Port 528 may provide AC power. Port 530 may provide proximity detection that makes sure the plug is entirely plugged in. Port 532 may provide ground wire. Port 534 may provide communications used to relay data between the car and the charger indicating how much current is needed.

The plug 522 may be placed into the charging port 524 of the vehicle to provide power to the vehicle as the system generates power through wind rotating the airfoils. The plug 522 can be placed in the charging port at any time. When the system generates power, the power can be transferred to the vehicle through the charging port. The plug 522 can provide power as the system generates power, and/or the system can generate the power, store the power, then transfer it to the vehicle.

In some implementations, charging plug-in unit 500 could be hardwired to the existing wiring harness that leads to the battery which may be installed at the factory level for vehicles ordered with a built in energy generating system. In one embodiment, a diverter may allow the energy capturing system to power other components of the vehicle. For example, the energy generating system may provide power to the air conditioner. In order to direct power to another component of the vehicle, the operator may select a switch to direct the energy from the battery into another component of the vehicle.

Figure 6:
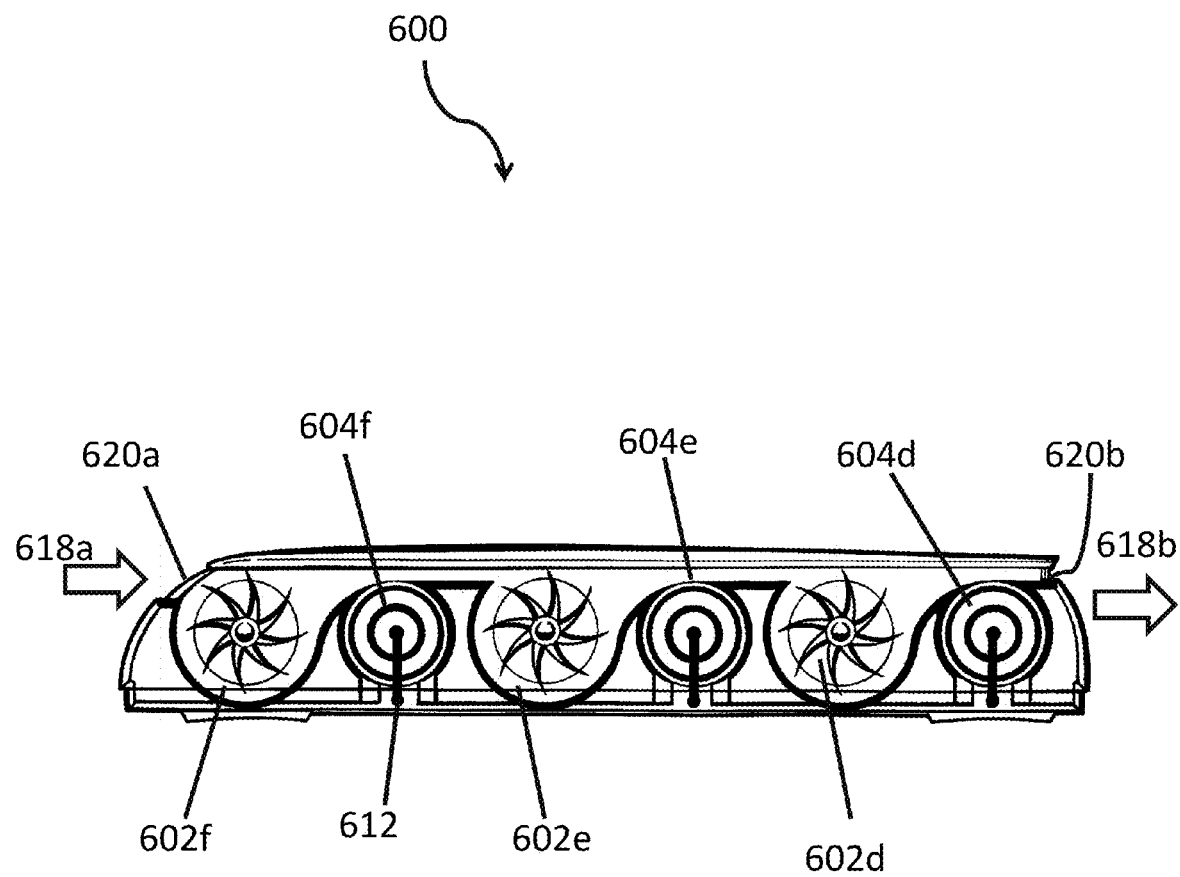
FIG. 6 shows a side view of the energy generating system, according to an exemplary embodiment.

FIG. 6 shows a side view of the energy generating system, according to an exemplary embodiment. As shown in FIG. 6, the energy generating system 600 includes a frame 616, airfoils 602*f,* 602*e,* 602*d*, generators 604*f,* 604*e,* 604*d*, wire harness 612, mounting mechanisms 214, and an air intake opening 618*a* and an air exhaust opening 618*b* formed in the frame 616. The energy generating system 600 may further include a mesh grill 620*a*, 620*b* to cover the air intake and exhaust openings 618*a*, 618*b*. The mesh grill 618*a*, 618*b* may be configured with openings that maximize air flow and/or provide for directional movement of air flowing in and out of the frame 616. It is understood that the mesh grill 618*a*, 618*b* can be formed of any suitable material, such as aluminum or plastic, and may be formed integral with or separate from the frame 616. It is also understood that only one of the air intake and exhaust openings 618*a*, 618*b* may be covered by the mesh grill 618*a*, 618*b*.

The frame 616 may be molded of a plastic or a composite material and have an integrated aluminum structure to provide mounting points for components of the energy generating system 600. It is understood that other suitable materials can be used to form the frame and/or mounting structures of the energy generating system 600, and that the frame 616 can comprise multiple pieces.

Figure 7:
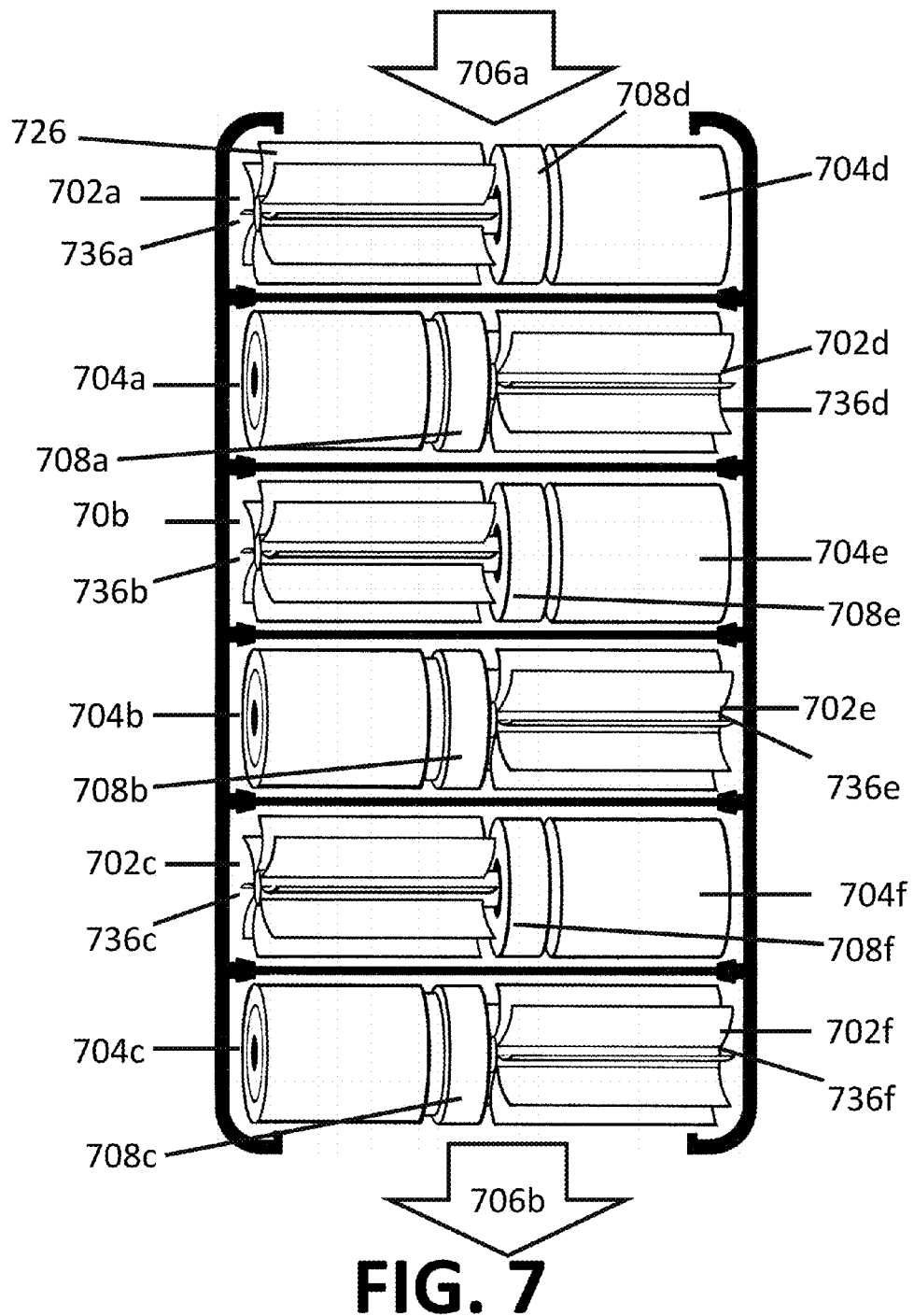
FIG. 7 shows a top view of the energy generating system, according to an exemplary embodiment.

FIG. 7 shows a top view of the energy generating system, according to an exemplary embodiment. The system comprises a plurality of airfoils 702*a,* 702*b,* 702*c,* 702*d,* 702*e,* 702*f* that are respectively coupled to axles 736*a,* 736*b,* 736*c,* 736*d,* 736*e,* 736*f.* The axles 736*a,* 736*b,* 736*c,* 736*d,* 736*e,* 736*f* are respectively coupled to a plurality of gearboxes 708*a,* 708*b,* 708*c,* 708*d,* 708*e,* 708*f,* which in turn are respectively coupled to a plurality of electromechanical generators 704*a,* 704*b,* 704*c,* 704*d,* 704*e,* 704*f.*

The gearboxes 708*a,* 708*b,* 708*c,* 708*d,* 708*e,* 708*f* are configured to increase the rotational speed of axles 736*a,* 736*b,* 736*c,* 736*d,* 736*e,* 736*f* and transmit the resulting increased speed to electromechanical generators 704*a,* 704*b,* 704*c,* 704*d,* 704*e,* 704*f.* The use of gearboxes 708*a,* 708*b,* 708*c,* 708*d,* 708*e,* 708*f* allows for smaller size, lower weight, and higher speed generators. For example, the use of gearboxes 708*a,* 708*b,* 708*c,* 708*d,* 708*e,* 708*f,* allows the rotational speed of axle 736*a,* 736*b,* 736*c,* 736*d,* 736*e,* 736*f* to be increased significantly, which in turns allows for the use of a high rotational speed generator. A high speed generator has a smaller dimension and lighter weight, thus, the requirement for the supporting structure is less stringent than, for example, a direct drive generator. The gearboxes 708a, 708b, 708c, 708d, 708e, 708f may be a single-stage speed-up gearbox, but the invention is not limited thereto.

As shown in FIG. 7, the energy generating system 700 comprises a plurality of airfoils 702a, 702b, 702c, 702d, 702e, 702f, which rotate on an axis 738a, 738b, 738c, 738d, 738e, 738f that is perpendicular to an axis 740a, 740b along a direction of air flow 706a, 706b. The airfoils 702a, 702b, 702c, 702d, 702e, 702f may be staggered in multiple rows perpendicular to the axis 740a, 740b along a direction of air flow 706a, 706b to prevent any counter resistance of air flow 706a, 706b.

The airfoils 702a, 702b, 702c, 702d, 702e, 702f may be arranged in a staggered pattern. Each airfoil 702a, 702b, 702c, 702d, 702e, 702f may be staggered on a parallel axis 738a, 738b, 738c, 738d, 738e, 738f. In each column and row, the airfoils 702a, 702b, 702c, 702d, 702e, 702f may be surrounded by electromechanical generators 704a, 704b, 704c, 704d, 704e, 704f and gearboxes 708a, 708b, 708c, 708d, 708e, 708f.

The gearboxes 7086a, 708b, 708c, 708d, 708e, 708f may each be configured with an input shaft (e.g., low speed shaft) and an output shaft (e.g., high speed shaft) that are respectively coupled (directly or indirectly) to airfoils 702a, 702b, 702c, 702d, 702e, 702f and electromechanical generators 704a, 704b, 704c, 704d, 704e, 704f. The gearboxes 708a, 708b, 708c, 708d, 708e, 708f transmit torque between the input shaft and the output shaft. For example, the input shaft of gearbox 708b may be axle 736b on which airfoil 702a is coupled. The output shaft may have one end that is coupled to the gearbox and another end that is coupled to the electromechanical generator 104d. According to an embodiment of the invention, the gearboxes 708a, 708b, 708c, 708d, 708e, 708f are configured to provide a speed up ratio of approximately 4:1 (e.g., one revolution of the input shaft turns the output shaft approximately four times).

As shown in FIG. 7, for example, airfoil 702a, may be staggered with airfoil 702d by being placed in different positions on parallel axes 738a, 738b. Airfoil 702a may be primarily surrounded on the right side by gearbox 708d that is coupled to electro-mechanical generator 704d and on the bottom by electro-mechanical generator 704a and gearbox 708b.

In one embodiment, the airfoils 702a, 702b, 702c, 702d, 702e, 702f may not overlap in the staggering. For example, the bottom edge of airfoil 702a may not overlap with the top edge of airfoil 702d by staying within the boundary of the first row and not extending into the second row comprising electro-mechanical generator 704a, gearbox, 708b, and airfoil 702d.

In another embodiment, there may be overlap of the airfoils 702a, 702b, 702c, 702d, 702e, 702f in the staggering. For example, airfoil 702a may have a bottom edge that extends into the second row comprising electro-mechanical generator 704a, gearbox, 708b, and airfoil 702d.

In some implementations, the airfoils 702a, 702b, 702c, 702d, 702e, 702f may be staggered horizontally across the vehicle and/or vertically across the vehicle in order to convert wind energy into electrical energy. As the vehicle moves forward, the air flow 706a, 706b may start at the first airfoil 702f and end at the last generator 704d. Each airfoil 702a, 702b, 702c, 702d, 702e, 702f may comprise a plurality of blades 726 extending outward from an axle 736a, 736b, 736c, 736d, 736e, 736f which is central to the blades 726. The blades 726 may rotate in a direction perpendicular of air flow 706a, 706b. The blades of each airfoil 702a, 702b, 702c, 702d, 702e, 702f may catch the wind and cause the airfoil to rotate in a clockwise manner.

Each airfoil 702a, 702b, 702c, 702d, 702e, 702f may comprise a plurality of blades 126 that radially extend from an axle 736a, 736b, 736c, 736d, 736e, 736f of the airfoils. Each blade 726 may include a leading edge that is coupled to the axle 736a, 736b, 736c, 736d, 736e, 736f and a trailing edge that extends outwards. For example, the air flow 706a, 706b may engage the leading edge and flow toward the trailing edge of airfoil 702a. Due to the shape of the plurality of blades 726, aerodynamic forces caused by the flow induce the blades 726 to rotate, thereby turning the axle 736a. Efficiency of the system may be partially dependent upon converting linear air flow into rotational energy. Therefore, the blades 726 may be particularly configured to efficiently transfer wind energy into rotational motion. For instance, blade shape may be selected to enhance air flow over the blade such that aerodynamic forces induce the blade to rotate. In addition, the blades 126 may be substantially smooth, such that air flows over the blades 126 without interference.

The blades 726 may be coupled to an axle 736a, 736b, 736c, 736d, 736e, 736f of each airfoil. The blades 726 are configured to convert the linear air flow from the wind into rotational motion. As the blades 726 rotate, the coupling between the axle 736a, 736b, 736c, 736d, 736e, 736f and the gearboxes 708a, 708b, 708c, 708d, 708e, 708f begins to rotate. In turn, the coupling between the gearboxes 708a, 708b, 708c, 708d, 708e, 708f and a rotor of each electromechanical generator 704a, 704b, 704c, 704d, 704e, 704f begins to rotate, thereby producing electrical energy. The electromechanical generators 704a, 704b, 704c, 704d, 704e, 704f may convert the mechanical energy generated by the gearboxes to electrical energy for storage in a storage unit (e.g., battery and/or capacitor).

Figure 8A:
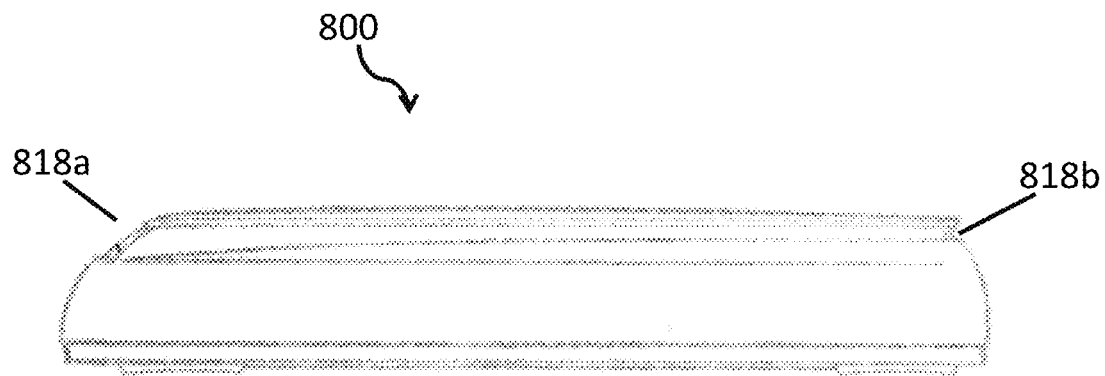
FIG. 8A shows a cover of the energy generating system, according to an exemplary embodiment.
Figure 8B:
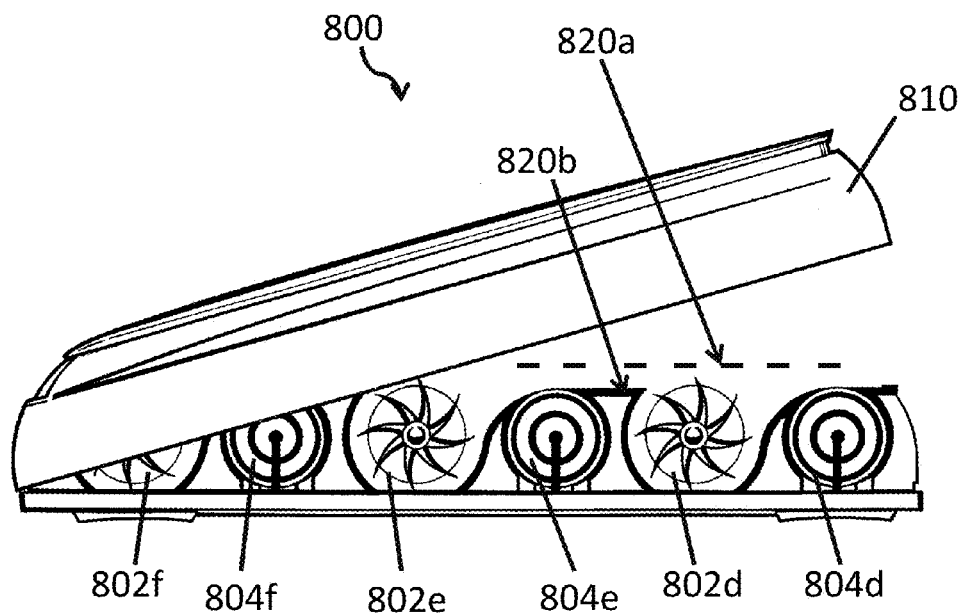
FIG. 8B shows the cover of the energy generating system partially open, according to an exemplary embodiment.

FIG. 8A shows a cover of the energy generating system, according to an exemplary embodiment. FIG. 8B shows the cover partially open, according to an exemplary embodiment.

As shown in FIG. 8A, the energy generating system 800 may further comprise a cover 810. The cover is formed with an air intake opening 818a and an air exhaust opening 818b. The openings 818a, 8186 are preferably provided at opposite sides of the energy generating system 800.

The cover 810 may be molded of a plastic material or formed of an aluminum material, but can also be formed of other suitable materials. The cover 810 may be configured with an aerodynamic shape, such a clam-shell one piece cover structure, that does not substantially add aerodynamic drag to a vehicle. For example, the cover 810 may have a smooth and tapered outer surface and be in the shape of an airfoil, preferably a symmetrical airfoil, to minimize aerodynamic drag. Such configuration offers many advantages, including a reduction in overall weight of the system and a reduction of components needed to form the air chamber.

As shown in FIG. 8B, the cover 810 may be removably or hingedly attached to the frame 816 so that the cover may be lifted or swung open to permit access to an inside of the system for service or cleaning. For example, one end of the cover 810 may be hingedly secured to a corresponding end of the frame 816 by a hinge mechanism. The hinge mechanism may comprise a pair of hinge units with one of the hinge units being provided at the frame 816 and the other being provided at the cover 810. Preferably, the hinge units are provided on an inside surface of the frame 816 and an inside surface of the cover 810. The hinge units may be secured to the frame 816 and cover 810 by any suitable securement means, such as through the use of bolts. It is understood that the hinge mechanism is not limited to the above embodiment. The cover 810 is capable of swinging about the hinge mechanism between a first closed position and a second open position.

The air chamber of the energy generating system may be partially formed by the cover 810. More particularly, the air chamber may comprise an upper portion 820a and a lower portion 820b. The upper portion 820a may be formed by the cover 810. Specifically, the top inside surface of the cover 810 may be shaped and molded to form the upper portion 820a of the air chamber. The air chamber is fully formed (e.g., completed) when the cover 810 is closed.

According to yet another implementation of the invention, the frame 816 may comprise a bottom surface that is provided below the arrangement of airfoils 802f, 802e, 802d and encloses the bottom of the energy generating system 800. The bottom surface of the frame 816 is preferably substantially planar. The bottom surface may be formed integral with the frame 816, or be a separate structure. The bottom surface may comprise a pan, such as, for example, a belly pan with air holes.

The exemplary embodiments of the energy generating system described above may adaptable for use with any vehicle or locomotive having any powertrain (e.g., gasoline engine, diesel engine, electric engine, hybrid engine, hydrogen engine), such as the embodiments shown in FIGS. 9, 10, 11, and 12.

Figure 9:
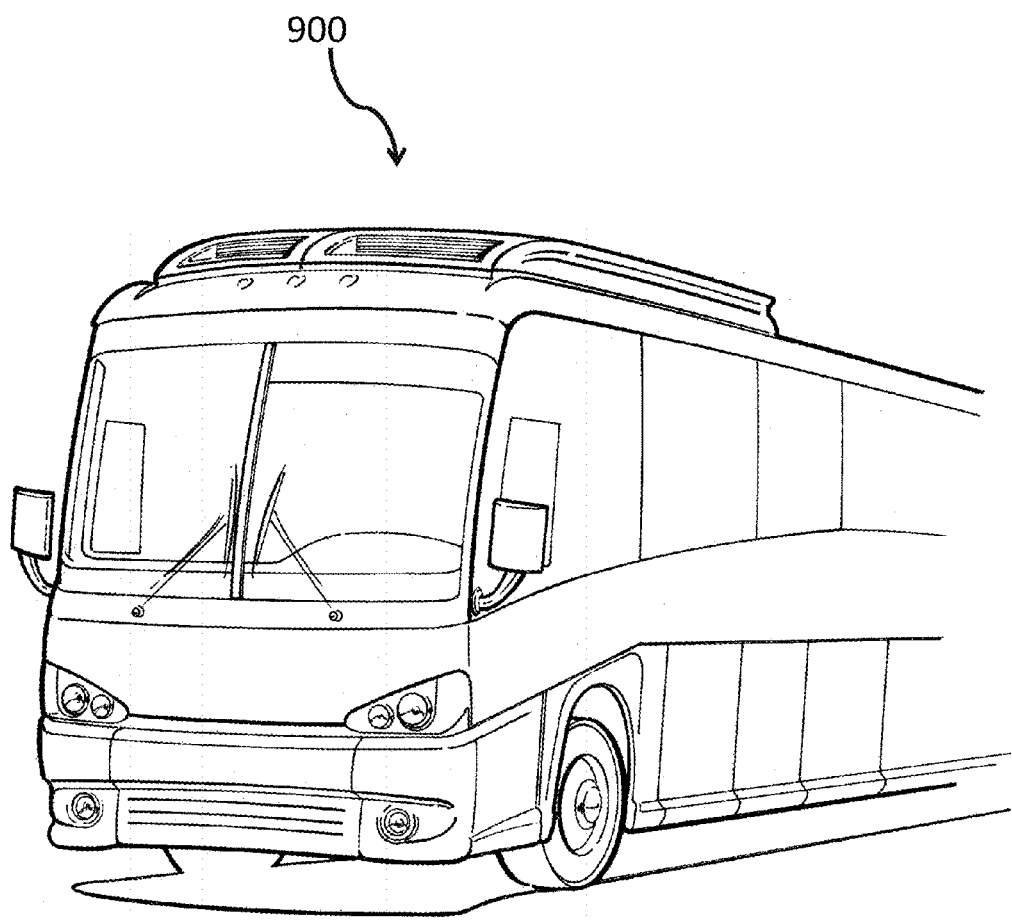
FIG. 9 shows a front perspective view of the energy generating system implemented system implemented on a top portion of a bus, according to an exemplary embodiment.
Figure 10:
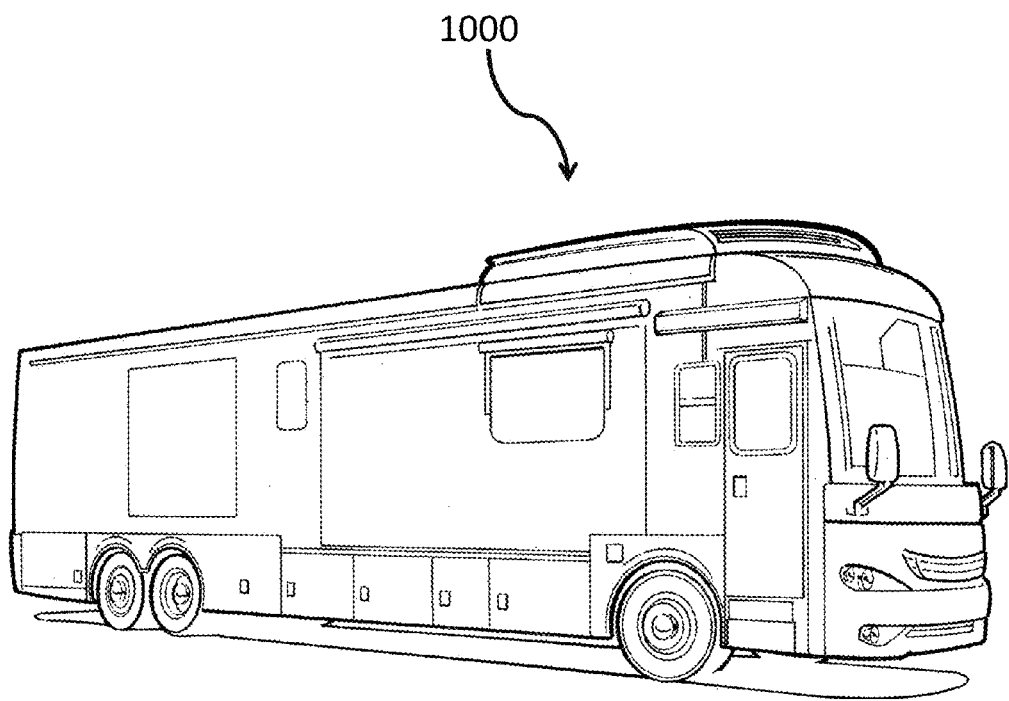
FIG. 10 shows a side view of the energy generating system implemented on a top portion of a recreational vehicle, according to an exemplary embodiment.
Figure 11:
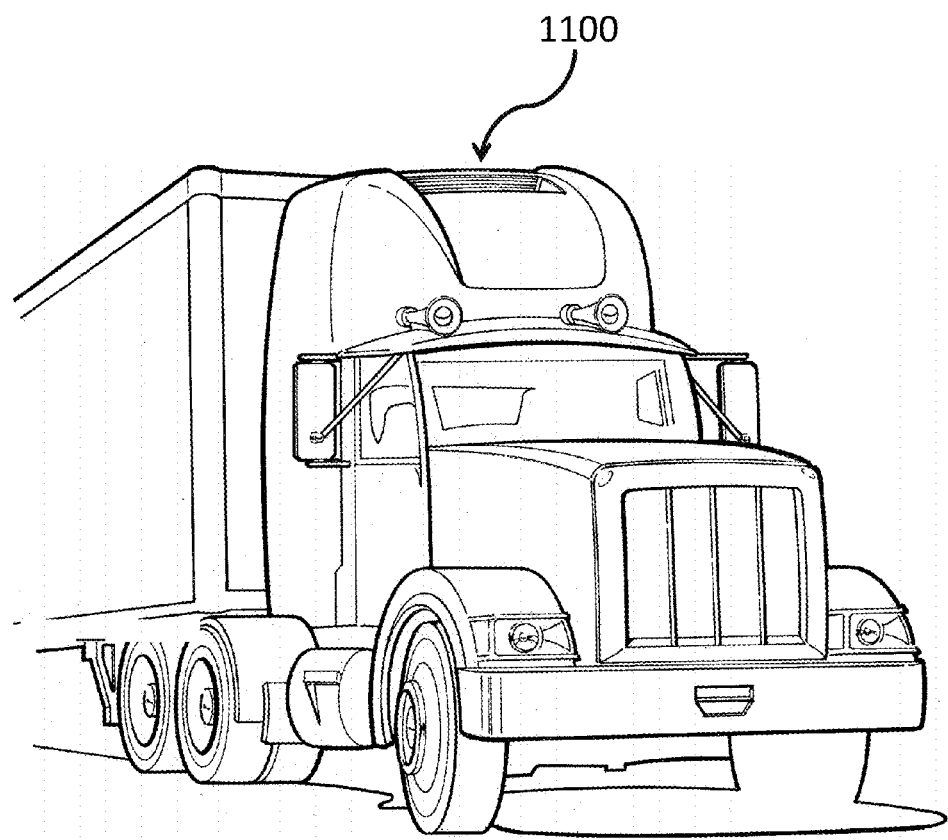
FIG. 11 shows a front perspective view of the energy generating system implemented on a top portion of a tractor unit of a semi-trailer truck, according to an exemplary embodiment.
Figure 12:
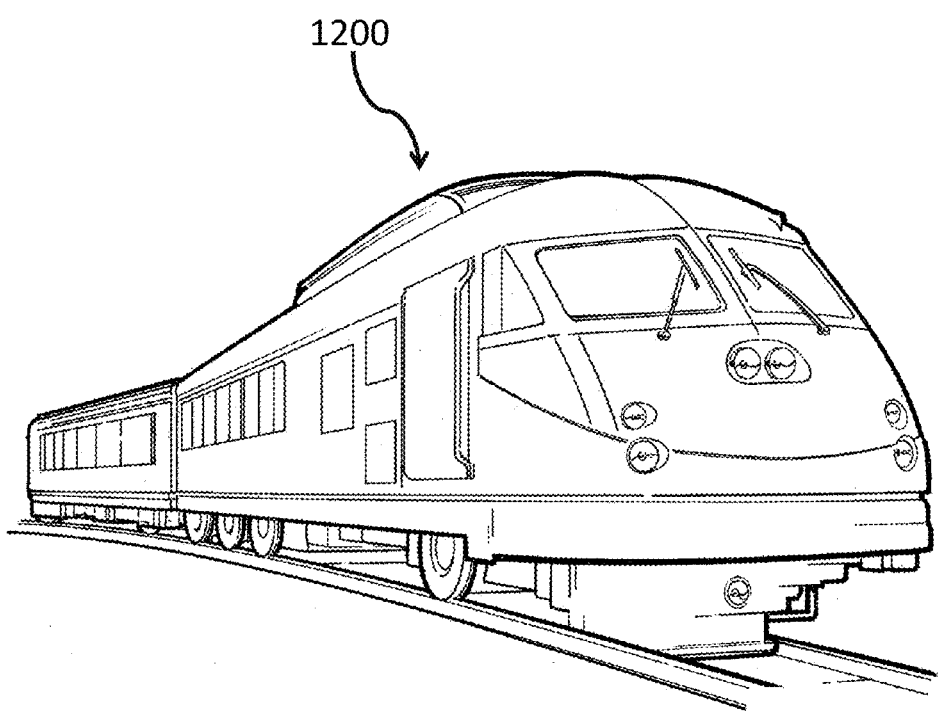
FIG. 12 shows a side view of the energy generating system on a top portion of a train, according to an exemplary embodiment.

For example, the energy generating system 900 may be implemented on a top portion or roof area of a bus, such as shown in FIG. 9. The energy generating system 1000 may be implemented on a top portion or roof area of a recreational vehicle, such as shown in FIG. 10. The energy generating system 1100 may be implemented on a top portion or roof area of a tractor unit of a semi-trailer truck, such as shown in FIG. 11. The energy generating system 1100 may be integrated within or behind an aerodynamic module that is attached to the roof area of the tractor unit. Additionally, the energy generating system 1200 may be implemented on a top portion of a train, as shown in FIG. 12.

There have been shown and described several embodiments of heat generators having permanent magnets. Changes in materials, structures, arrangement of structures can be made by persons skilled in the art without departing from the invention.

The embodiments described above are intended to be exemplary. One skilled in the art recognizes that numerous alternative components and embodiments that may be substituted for the particular examples described herein and still fall within the scope of the invention.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. An energy generating system, the system comprising:
a plurality of airfoils each having an airfoil axis of rotation that is perpendicular to an axis along a flow of air, the airfoils being staggered in multiple rows perpendicular to the axis along the flow of air and across a top surface of a vehicle;
a plurality of generators each comprising a rotor and a stator,
wherein at least one stator is configured to channel the airflow along the leading edge of at least one of the airfoils,
wherein the rotor is connected to one of the plurality of airfoils,
wherein the generator is configured to generate electrical power by the flow of air driving the rotor to rotate around the airfoil axis;
a plurality of wires connected to the generators, the wires configured to transmit the electrical power into a storage unit;
a plug connected to the storage unit and attached to a charging port of the vehicle, the charging port configured to charge the vehicle with the stored electrical power; and
a housing, wherein the housing comprises:
a frame provided with mounting structures that attach to the plurality of airfoils and the plurality of generators within the housing, and
a top surface attached to the frame, the top surface having an top inside surface that forms an upper surface of an air chamber of the energy generating system.

2. The system of claim 1, wherein the plurality of airfoils each comprise:
an axle; and
a plurality of blades that radially extend from the axle.

3. The system of claim 2, wherein each of the axles is connected to one of the rotors of the plurality of generators.

4. The system of claim 1, wherein the top surface is the roof of the vehicle.

5. The system of claim 1, wherein the energy generating system is additionally located on a side of the vehicle.

6. The system of claim 1, wherein the energy generating system is additionally located in a front grille of the vehicle.

7. The system of claim 1, wherein the storage unit is a battery.

8. The system of claim 1, wherein the storage unit is a capacitor.

9. An energy generating system, the system comprising:
a plurality of airfoils each having an airfoil axis of rotation that is perpendicular to an axis along a flow of air, the airfoils being staggered in multiple rows perpendicular to the axis along the flow of air and across a top surface of a vehicle;
a plurality of generators each comprising a rotor and a stator,
wherein at least one stator is configured to channel the airflow along the leading edge of at least one of the airfoils,
wherein the rotor is connected to one of the plurality of airfoils,
wherein the generator is configured to generate electrical power by the flow of air driving the rotor to rotate around the airfoil axis; and a housing, wherein the housing comprises:
  a frame provided with mounting structures that attach to the plurality of airfoils and the plurality of generators within the housing, and
  a top surface attached to the frame, the top surface having an top inside surface that forms an upper surface of an air chamber of the energy generating system.

10. The system of claim 9, further comprising:
a plurality of wires connected to the generators, the wires configured to transmit the electrical power into a storage unit; and
a plug connected to the storage unit and attached to a charging port of the vehicle, the charging port configured to charge the vehicle with the stored electrical power.

11. The system of claim 10, wherein the storage unit is a battery.

12. The system of claim 10, wherein the storage unit is a capacitor.

13. The system of claim 9, wherein the plurality of airfoils each comprise:
an axle; and
a plurality of blades that radially extend from the axle.

14. The system of claim 13, wherein each of the axles is connected to one of the rotors of the plurality of generators.

15. The system of claim 9, wherein the top surface is the roof of the vehicle.

16. The system of claim 9, wherein the energy generating system is additionally located on a side of the vehicle.

17. The system of claim 9, wherein the energy generating system is additionally located in a front grille of the vehicle.

18. An energy generating system, the system comprising:
a plurality of airfoils each having an airfoil axis of rotation that is perpendicular to an axis along a flow of air, the airfoils being staggered in multiple rows perpendicular to the axis along the flow of air and across a top surface of a vehicle;
a plurality of gearboxes, each gearbox coupled to one of the plurality of airfoils;
a plurality of electro-mechanical generators each comprising a rotor and a stator,
  wherein at least one stator is configured to channel the airflow along the leading edge of at least one of the airfoils,
  wherein the rotor is connected to one of the gearboxes;
  wherein each of the gearboxes provides a speed up ratio for the rotational speed of the connected airfoil axis to drive the connected rotor of the generator;
  wherein the generator is configured to generate electrical power by the flow of air driving the airfoil to rotate around the airfoil axis, thereby driving the rotor of the generator;
a plurality of wires connected to the generators, the wires configured to transmit the electrical power into a storage unit; and
a plug connected to the storage unit and attached to a charging port of the vehicle, the charging port configured to charge the vehicle with the stored electrical power; and
a housing, wherein the housing comprises:
  a frame provided with mounting structures that attach to the plurality of airfoils, the plurality of gearboxes, and the plurality of generators within the housing, and
  a top surface attached to the frame, the top surface having an top inside surface that forms an upper surface of an air chamber of the energy generating system.

19. The system of claim 18, wherein the plurality of airfoils each comprise:
an axle; and
a plurality of blades that radially extend from the axle.

* * * * *